United States Patent [19]

Ueki et al.

[11] Patent Number: 4,951,528
[45] Date of Patent: Aug. 28, 1990

[54] SHIFT CONTROL SYSTEM FOR AUTOMATIC TRANSMISSION

[75] Inventors: Akihiro Ueki, Zama; Kazuhiko Sugano, Yokohama, both of Japan

[73] Assignee: Nissan Motor Co., Ltd., Yokohama, Japan

[21] Appl. No.: 264,717

[22] Filed: Oct. 31, 1988

[30] Foreign Application Priority Data

Oct. 30, 1987 [JP] Japan .................................. 62-273223

[51] Int. Cl.$^5$ ............................................. B60K 41/10
[52] U.S. Cl. .................................................... 74/868
[58] Field of Search .......................... 74/868, 869, 870

[56] References Cited

U.S. PATENT DOCUMENTS 3,895,542  7/1975  Miyauchi ............................. 74/868
4,334,442  6/1982  Iwanaga et al. .................. 74/868 X
4,347,764  9/1982  Lauven ............................. 74/868 X
4,537,095  8/1985  Morisawa .......................... 74/869 X

FOREIGN PATENT DOCUMENTS 58-156757  9/1983  Japan .

Primary Examiner—Leslie A. Braun
Assistant Examiner—Harold F. Macris
Attorney, Agent, or Firm—Foley & Lardner, Schwartz, Jeffery, Schwaab, Mack, Blumenthal & Evans

[57] ABSTRACT

A throttle presure and a modified throttle pressure which is higher than the throttle pressure are developed and the spool of the 2-3 shift valve arranged to be biased toward its downshift position by the throttle pressure when in its upshift position and toward its downshift position by the modified throttle pressure when in its downshift position. The difference between the throttle pressure and the modified throttle pressure is arranged to increase as the level of the throttle pressure decreases.

5 Claims, 5 Drawing Sheets

FIG. 6

| | | R/C | H/C | F/C | O/C | B/B 2A | B/B 3R | B/B 4A | L&R/B | F/O | L/O | GEAR RATIO | GEAR RATIO ($\alpha_1=0.45$, $\alpha_2=0.45$) |
|---|---|---|---|---|---|---|---|---|---|---|---|---|---|
| D RANGE | ENGINE DRIVING 1ST | | | ○ | | | | | | ○ | ○ | $\frac{1+\alpha_1}{\alpha_1}$ | 3.22 |
| | ENGINE DRIVING 2ND | | | ○ | | | ○ | | | ○ | | $\frac{\alpha_1+\alpha_2+\alpha_1\alpha_2}{\alpha_1(1+\alpha_2)}$ | 1.69 |
| | ENGINE DRIVING 3RD | | ○ | ○ | | ○ | ○ | | | ○ | | 1 | 1 |
| | ENGINE DRIVING 4TH | | ○ | (○) | ○ | | ○ | ○ | | | | $\frac{1}{1+\alpha_2}$ | 0.69 |
| | ENGINE BRAKING 1ST | | | (○) | ○ | ○ | | | | | | | |
| | ENGINE BRAKING 2ND | | | (○) | ○ | | ○ | | | | | | |
| | ENGINE BRAKING 3RD | | ○ | (○) | ○ | ○ | ○ | | | | | | |
| | ENGINE BRAKING 4TH | | ○ | (○) | | | ○ | ○ | | | | | |
| 2ND RANGE | 1ST | | | ○ | | ○ | | | | ○ | ○ | | |
| | 2ND | | | ○ | | | ○ | | | ○ | | | |
| 1ST RANGE | 1ST | | | ○ | | | | | ○ | ○ | | | |
| REVERSE | | ○ | | | | | | | ○ | | | $-\frac{1}{\alpha_2}$ | −2.22 |

( ) UNRELATED TO POWER TRANSMISSION

SHIFT CONTROL SYSTEM FOR AUTOMATIC TRANSMISSION

BACKGROUND OF THE INVENTION

1. Field of the Invention

The present invention relates generally to a shift valve arrangement for use in an automatic transmission and more specifically to a shift valve arrangement which permits the transmission to downshift directly between the first and last of three sequential speeds when the transmission is subject to coasting and which provides an adequate separation between the first-second and second-third upshifts shifts under low load.

2. Description of the Prior Art

JP-A-58-156757 discloses a four (forward) speed transmission wherein a one-way clutch is utilized during first speed. With this arrangement when the transmission undergoes a 1-2 upshift or a 2-1downshift, the one-way clutch changes from an engaged state to a released one and vice versa, and provides for relatively smooth shifting. When the vehicle is coasting and the transmission downshifts, rather than a sequential 3-2-1 downshift, a direct 3-1 shift tends to produce a smaller shift shock. The reason for this is that a 3-2 downshift does not involve the one-way clutch and the amount of shift shock tends to be relatively large. On the other hand, a 3-1 downshift induces the engagement of the one-way clutch and as a result a smaller amount of shock tends to be produced.

However, with this type of transmission even though the transmission produces relatively little shift shock, if induced to produce a 3-1 downshift under vehicle coasting, in order to enable such a shift, the 3-2 shift line has to be set lower than the 2-1 shift line in the low throttle opening region. However, if the 3-2 downshift line is set in this manner, the 2-3 upshift line is drawn into close proximity thereto in the low thottle setting region. In some instances this actually establishes a 1-3 upshift line. Alternatively, if the 1-3 upshift line is not established, the 2-3 upshift occurs immediately after the 1-2 upshift. In either case the shift feeling is deteriorated.

SUMMARY OF THE INVENTION

It is an object of the present invention to provide a shift arrangement which attenuates shift shock enabling a 3-1 downshift during coasting and appropriately spaced 1-2 and 2-3 upshifts under low load.

In brief, this object is achieved by a system which includes valves via which a throttle presure and a modified throttle pressure which is higher than the throttle pressure are developed and wherein the spool of a given shift valve arranged to be biased toward its downshift position by the throttle pressure when in its upshift position and toward its downshift position by the modified throttle pressure when in its downshift position. The valves which produce the throttle pressure and the modified throttle pressure are arranged so that the difference between the two pressures increases as the level of the throttle pressure decreases.

More specifically, the present invention is deemed to comprise a transmission which features: a source of governor pressure indicative of vehicle speed; a throttle valve for producing a throttle pressure indicative of transmission load; a throttle pressure modifier valve for producing a modified throttle pressure which has a level higher than that of the throttle pressure, the throttle valve and the throttle pressure modifier valve being arranged so that as the throttle pressure decreases the difference between the throttle pressure and the modified throttle pressure increases; and a shift valve for selectively supplying pressurized hydraulic fluid to a friction element of the transmission, the shift valve having a spool, the spool having a first section responsive to the governor pressure and which produces a bias which tends to move the spool toward an upshift position, and a second section, the second section being arranged to produce a bias which tends to move the spool toward a downshift position, the second section being exposed to the throttle pressure when the spool assumes the upshift position and exposed to the modified throttle pressure when the spool assumes the downshift position.

BRIEF DESCRIPTION OF THE DRAWINGS

FIG. 6 is a table showing the relationship between the friction element engagement and the gear ratio produced by the transmission arrangement shown in FIGS. 2 and 3.

DETAILED DESCRIPTION OF THE PREFERRED EMBODIMENTS

Figure 2:
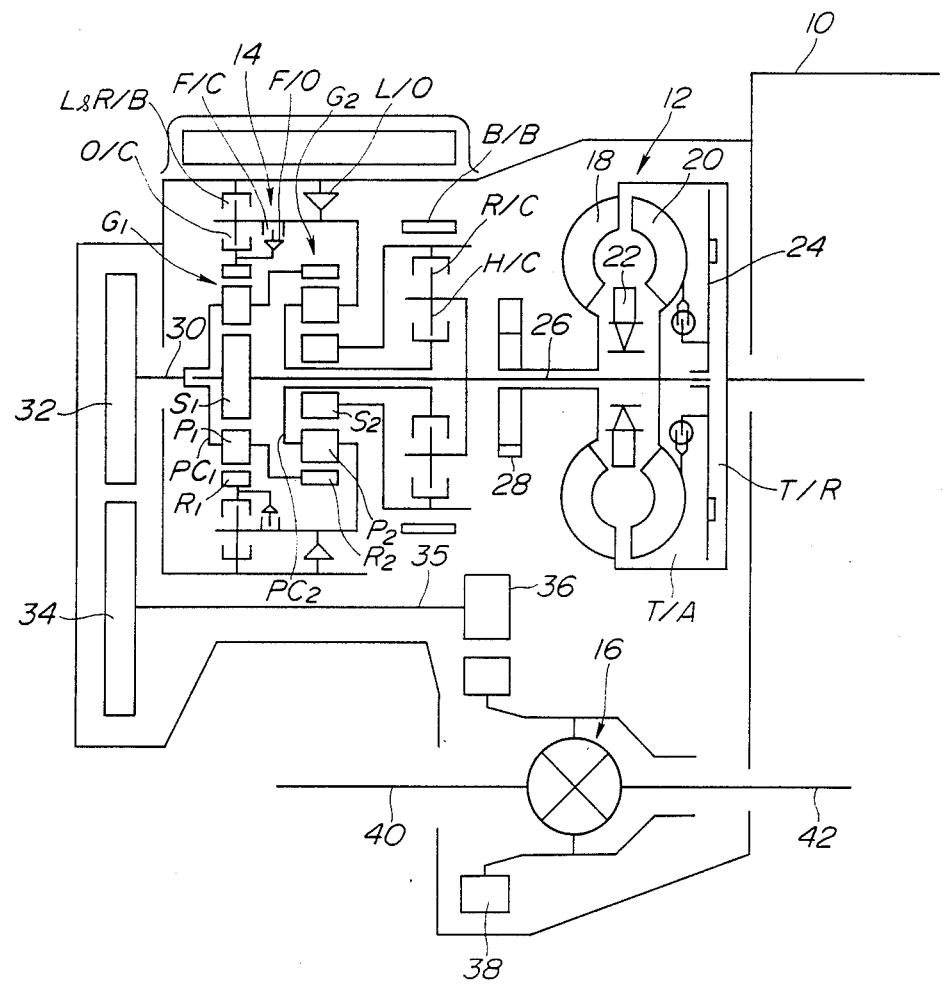
FIG. 2 is a schematic elevation showing a transaxle of the type to which the present invention can be applied.

FIG. 2 shows in schematic elevational form, an automatic transaxle which includes a torque converter 12, a planetary gear train and a differential or final drive unit 16. This unit is arranged traversely across the vehicle chassis and is connected to an engine 10 at one end thereof. The torque converter (T/C) in this instance includes a pump impeller 18, turbine runner 20, stator 22 and a lock-up clutch 24. With this arrangement when the lock-up clutch 24 is disengaged torque from the engine crankshaft (no numeral) is supplied by way of the pump impeller 18 to a transmission input shaft 26. However, upon engagement of the lock-up clutch the torque is supplied directly to the input shaft 26.

In this transaxle the lock-up clutch 24 is arranged to be responsive to the pressure differential which exists between an apply chamber A/T and a release chamber T/R. It should be noted that an oil pump 28 which outputs pressurized hydraulic fluid is arranged to be driven by the T/C.

The planetary gear train includes first and second gear units G1, G2. The first unit G1 includes a sun gear S1, an internal or ring gear R1 and pinion gears P1 which establish mesh with the ring and sun gears. The pinion gears P1 are of course are rotatably disposed on a pinion carrier PC1. The second unit G2 similarly includes a sun gear S2, a ring gear R2, pinion gears P2 and a carrier PC2.

The sun gear S1 of the first unit G1 is connected to the input shaft 26 in a manner to undergo synchronous rotation therewith while pinion carrier PC1 and the ring gear R2 of the second unit G2 are connected with a transmission output shaft 30. The ring gear R1 of the first unit G1 is selectively connectable with carrier PC2 by way of the forward one-way cluch F/O and the overrunning clutch O/C. Sun gear S2 is selectively connectable with the input shaft 26 by way of the reverse clutch R/C while the pinion carrier PC2 is arranged to be connectable with the same via a high clutch H/C.

Sun gear S2 can be selectively rendered stationary via the application of a band brake B/B while the pinion carrier PC2 is operatively connected with the parallel low one-way clutch L/O and low and reverse brake L&R/B in a manner which enables the same to be selectively held stationary.

An output gear 32 is fixed to one end of the output shaft 30 and arranged to mesh with an idler gear 34. The latter mentioned gear is fixed to one end of a idler shaft 35 which extends parallel to the input shaft 26 and passes back through the transmission as shown. A reduction gear 36 is provided at the inboard end of the idler shaft 35. This gear meshes with a ring gear 38 of the differential unit 16.

Torque is delivered to the wheels of the vehicle by way of stub shafts 40 and 42. In this instance the shafts 40 and 42 are respectively connected with the forward left and right hand wheels of the vehicle.

With the above described arrangement selective engagement and/or use of the clutches F/C, H/C, O/C, R/C, the brakes B/B and L&R/B and the one-way clutches F/O and L/O it is possible to condition the first and second planetary gear units G1 and G2 to produce four forward and one reverse gear ratios in the manner as depicted in the table shown in FIG. 6.

It should be noted that in this table the circles denoted the engagement of an element and or the use of a one-way clutch. In this transmission the engagement of the band brake B/B is controlled by a servo having first, second and third chambers. That is, a second speed apply chamber 2A, a third speed release chamber 3R and a fourth speed apply chamber 4A. In connection with these chambers the circular indicia in the table indicate the chamber being applied with hydraulic pressure. Further, in this table alpha 1 and alpha 2 indicate the ratios of the teeth on the ring gears R1 and R2 and the corresponding sun gears S1 and S2, respectively. The gear ratio defined in the table denote the ratios defined between the rotational speeds of the output and input shafts 30, 26.

With the above described transmission arrangement rotational power or torque is transferred via the gear train from the input shaft 26 to the output shaft 30 and to the final drive or differential unit 16 by way of the output gear 32, the idler gear 34, reduction gear 36 and the ring gear 38. In fourth speed an overdrive condition is established.

Figure 3:
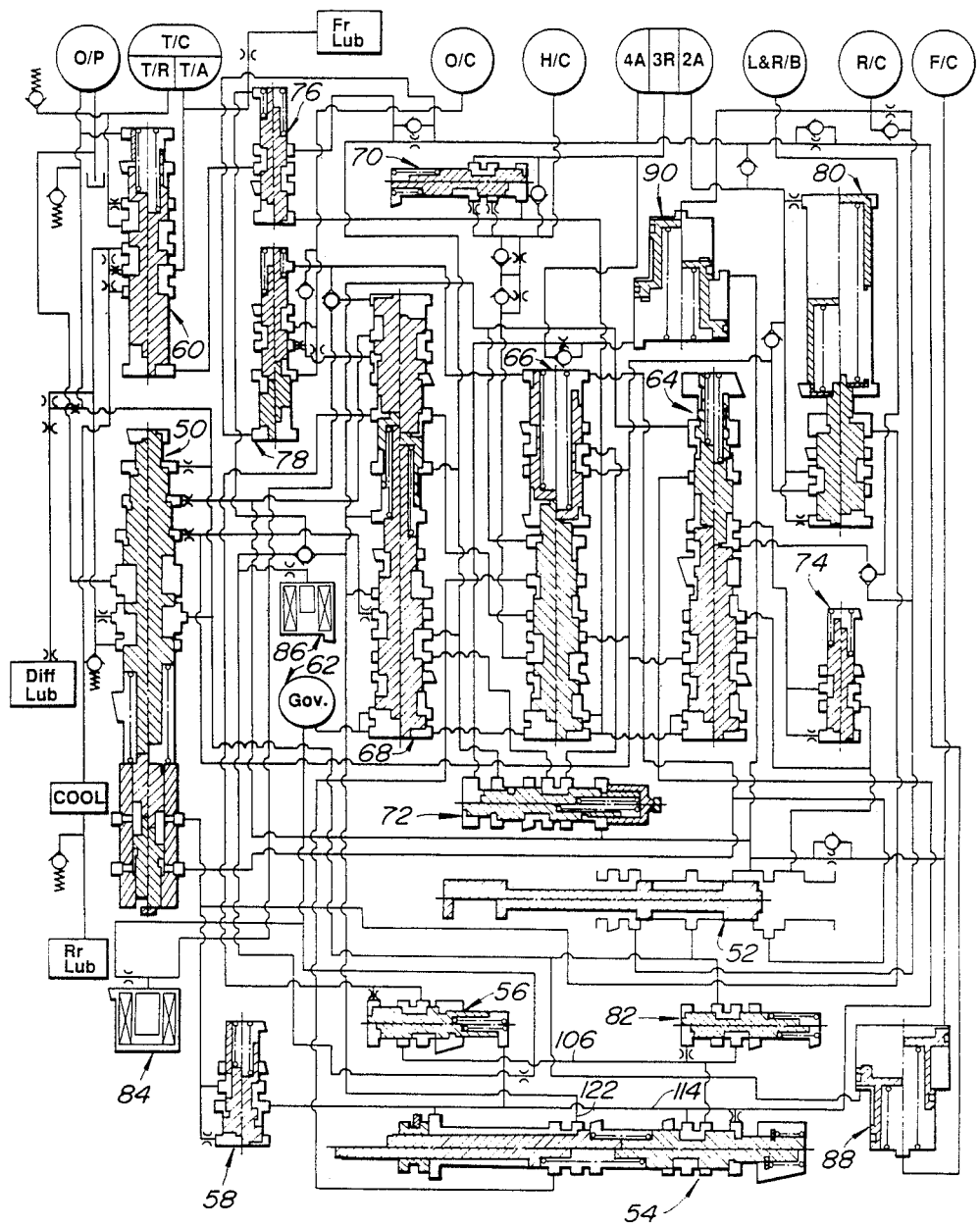
FIG. 3 is a schematic plan view showing a control circuit of the type which is used to control the transmission of the transaxle arrangement shown in FIG. 2 and which incorporates the present invention.

In order to control the above described gear train the hydraulic spool valve system of the nature shown in FIG. 3 is used.

This system includes a pressure regulator valve 50, a manual valve 52, a throttle valve 54, a throttle modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a fixed first speed pressure reducing valve 74, a speed cut-back valve 76, an overrunning clutch control valve 78, a 1-2 accumulator valve 80, a kickdown modifier valve 82, an overdrive inhibitor solenoid 84, idle solenoid 86, an N-D accumulator 88 and a servo release accumulator 90.

Figure 1:
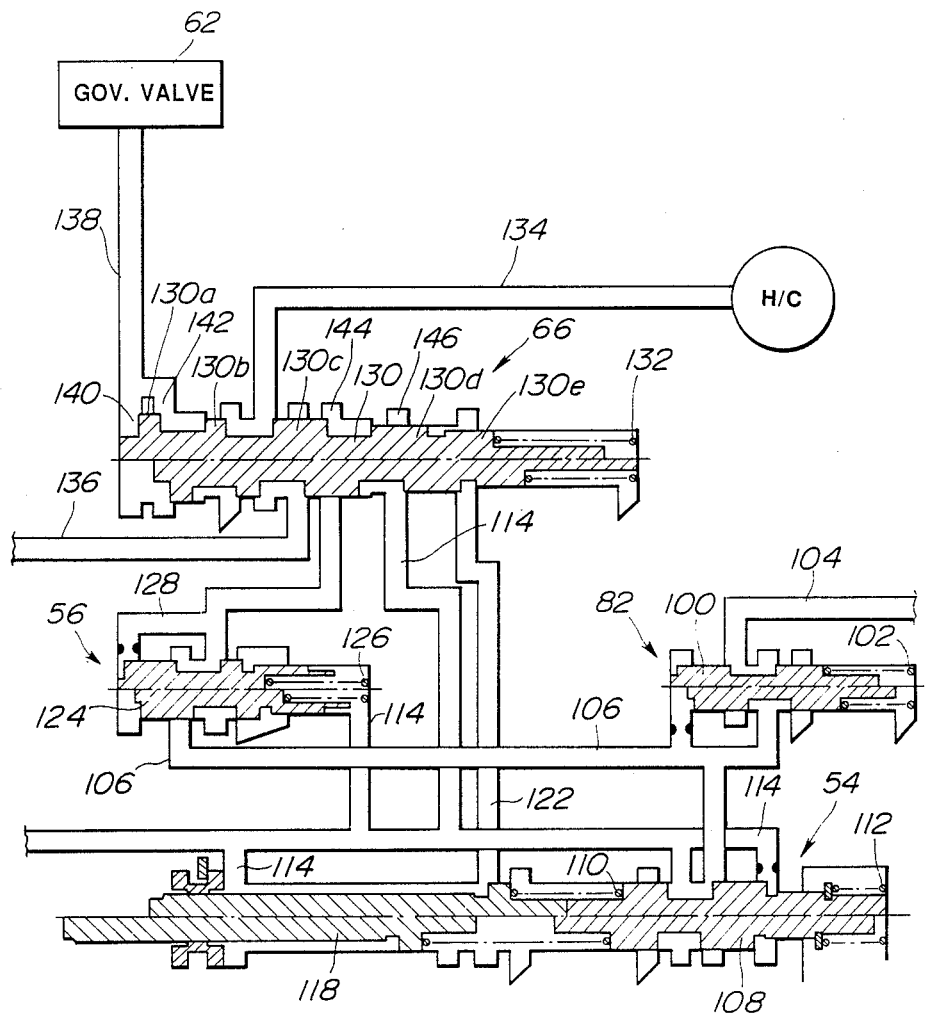
FIG. 1 shows a shift valve arrangement which characterizes the present invention.

FIG. 1 shows the arrangement which characterizes the present invention. As shown, the kickdown modifier valve 82 includes a spool 100 and a spring 102 which is disposed in one end of the valve bore (no numeral) and arranged to bias the spool 100 leftwardly as seen in the drawings. Line pressure which is supplied to the valve though conduit 104 is modified to a predetermined level in accordance with the strength of spring 102 and subsequently supplied into conduit 106.

Throttle valve 54 comprises a spool 108 and springs 110 and 112. The pressure discharged by the kickdown modifier valve 82 is supplied via conduit 106 and is modulated to form a "standard" throttle pressure in accordance with the force exerted by the springs 110 and 112. Spring 112 is, as shown, arranged between spools 108 and 118. Spool 118 is connected with the throttle valve control mechanism of the engine associated with the transmission. Accordingly, depending on the position of spool 118 the amount of force exerted by spring 110 varies with the result that the level of the throttle pressure is varied in accordance with the position of the engine throttle valve and thus represents the amount of torque or load which is applied to the transmission.

Figure 4:
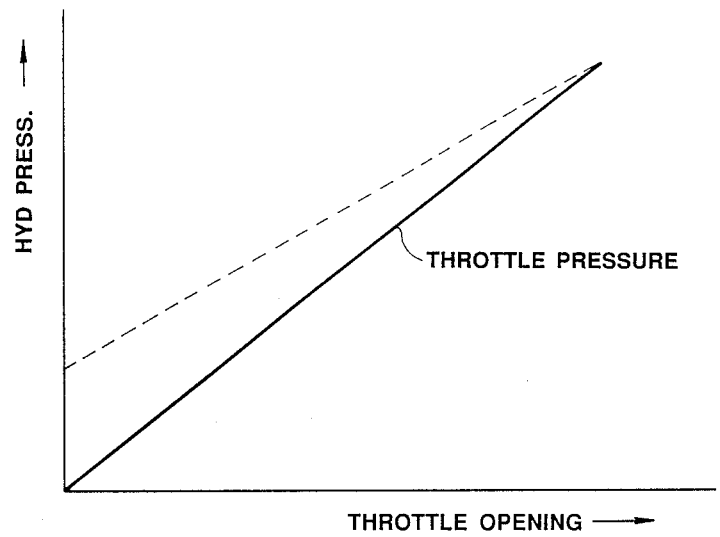
FIG. 4 is a chart showing in terms of a hydraulic pressure level and throttle opening, the difference in the rate at which the throttle pressure and the modified throttle pressure change with respect to throttle opening.

In FIG. 4 the solid line trace denotes the change in standard throttle pressure which occurs with throttle opening. As indicated, the level of this throttle pressure (as it will be simply referred to herinafter) increases from zero and increases directly proportionally with the throttle opening.

The throttle modifier pressure valve 56 comprises a spool 124 which is acted on by spring 126. The fixed level pressure which is supplied through conduit 106 is modified in accordance with the throttle pressure and the strength of the spring 126. As will be noted, the throttle pressure is supplied to the chamber in which spring 126 is disposed via conduit 114.

In the event that the level of the throttle pressure falls to zero, the output of the throttle modifier valve 56 is controlled to a predetermined minimum level determined by the strength of spring 126. as will be noted the cross-sectional area against which the throttle pressure acts is smaller than the area against which the feedback pressure which is supplied to the other end of the valve via conduit 128, acts. As a result the pressure which is produced by the throttle pressure modifier valve 56 increases more gradually than that of the corresponding (standard) throttle pressure (see the broken line is FIG. 4).

The 2-3 shift valve 66 comprises a spool 130 and a spring 132. In FIG. 1 the upper and lower half sections of the spool denote the downshift and upshift positions of the valve, respectively. It will be noted that for the sake of illustration simplicity, the provision and arrangement of a plug spool has been omitted in FIG. 1 to increase the ease of undertanding the elements which are essential to the operation of the valve, and has no influence of the operation of the present invention. FIG. 3 shows construction of the valve as actually used.

With the spool 130 in its downshift position, the 2-3 shift valve 66 is arranged to connect conduit 134 and the high clutch H/C to a drain port. On the other hand, upon the spool 130 assuming its upshift position, conduits 134 and 136 are placed in fluid communication and line pressure is supplied to the above mentioned friction element (H/C).

Governor pressure is supplied by way of conduit 138 to one end of the the 2-3 shift valve bore and the spool 130 exposed to the same in a manner to be subject to a bias which tends to move it toward its upshift position. In this arrangement the governor pressure is supplied to two ports of the shift valve—viz., ports 140 and 142. It will be noted that spool 130 is formed with lands 130a–130e. Of these, lands 130a and 130b are arranged to be exposed to the governor pressure. Land 130a is arranged to be larger in diameter than land 130b. Accordingly, when the spool 130 is in its downshift position, the area on which the governor pressure acts is smaller than in the case the spool is in its upshift position.

In the instant embodiment the pressure which is developed by the above mentioned throttle modulator valve 56 is supplied by way of conduit 128 to port 144 of the 2-3 shift valve. In addition, the throttle pressure which is developed by throttle valve 54 is supplied by way of conduit 114 to port 146. As land 130d is smaller in diameter than land 130c, a pressure differential area is defined. When the spool 130 assumes its downshift position, it is biased toward its downshift position by the modified throttle pressure acting on the same, while when the spool 130 assumes its upshift position, the area is acted on by the throttle pressure which is supplied through conduit 114 to produce a bias which also acts to move the spool toward its downshift position.

Lands 130d and 130e define another pressure differential area which is exposed to kickdown or detent pressure which is supplied via conduit 122.

Figure 5:
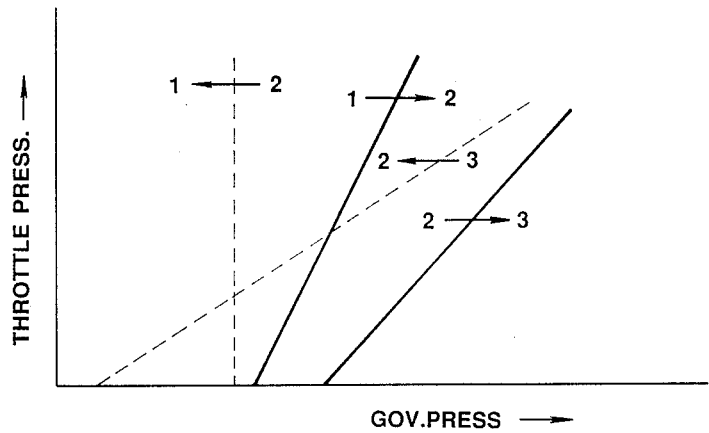
FIG. 5 is a chart showing the shift lines produced in accordance with the present invention.

The above arrangement operates as follows: as port 144 of the 2-3 shift valve is supplied with modified throttle pressure via conduit 128 and port 146 is supplied with throttle pressure via conduit 114, when the spool valve element 130 is in its downshift position, the modified throttle presssure is supplied into the valve bore in a manner wherein a bias, which tends to move the spool 130 to the left as shown in the drawings, is developed. On the other hand, the governor pressure which is supplied through conduit 138 acts on land 130b and tends to produce a bias which tends to move the spool to the right as seen in the drawings. Depending upon the difference in the forces produce the spool is moved between its upshift and downshift positions. FIG. 5 shows the shift characteristics produce by the above described arrangement. In this figure the 1-2 and 2-3 upshift lines are denoted by the solid line traces while the corresponding 2-1 and 3-2 downshift lines are denoted by the broken line traces. As will be noted 3-2 downshift line and the 2-3 upshift line are separated by hysteresis which is induced by the effect the governor pressure acting on lands 130a and 130b and by the effect of the throttle pressure and the modified throttle pressure being selectively applied to the pressure differential area defined between the lands 130c and 130d. When the throttle opening is low the amount of hysteresis increases. Accordingly, as shown in FIG. 5, when the throttle pressure drops close to zero, the 3-2 downshift line falls below the 2-1 downshift line. At the same time the 2-3 upshift line remains set in the relatively high speed area.

As the 3-2 downshift line intersects the 2-1 downshift line and enters the low speed low load area to the left of the 2-1 shift line, it is possible for a direct 3-1 downshift to take place under these conditions. Hence, when the vehicle is coasting and the throttle pressure drops to a low value (e.g. zero) rather than a sequential 3-2-1 downshifting taking place the transmission is able to shift directly from third speed to first.

Further, as the 2-3 upshift line does not occur at low throttle settings until the vehicle speed is relatively high, an adequate separation between the 1-2 and 2-3 shift lines is provided with the result that, in the event of acceleration (throttle pressure is relatively low), a suitably long period occurs between the 1-2 upshift and the subsequent 2-3 shift. Accordingly, the shift feeling provided by the transmission is improved.

What is claimed is:

1. In a transmission
   a source of governor pressure indicative of vehicle speed;
   a throttle valve for producing a throttle pressure indicative of transmission load;
   a throttle pressure modifier valve for producing a modified throttle pressure which has a level higher than that of the throttle pressure, said throttle valve and said throttle pressure modifier valve being arranged so that as the throttle pressure decreases the difference between said throttle pressure and said modified throttle pressure increases; and
   a shift valve for selectively supplying pressurized hydraulic fluid to a friction element, said shift valve comprising a spool and a bore in which said spool is reciprocatively received, said spool having a first section responsive to said governor pressure and which produces a bias which tends to move the spool toward an upshift position, and a second section, said second section being arranged to produce a bias which tends to move said spool valve toward a downshift position, said second section being exposed to said throttle pressure when said spool assumes said upshift position and said modified throttle pressure when said spool assumes said downshift position, said bore having first and second ports which are exclusively communicated with said throttle valve and modified throttle pressure valve, respectively, said spool having first and second lands which form part of said second section, said second land having a diameter which is larger than that of the first land, said first land being arranged to open said first port and permit throttle pressure to be supplied into said bore only when said spool assumes said upshift position, said second land being arranged to open said second port and permit modified throttle pressure to be admitted into said bore only when said spool assumes said downshift position.

2. A transmission as claimed in claim 1 wherein said throttle pressure modifier valve comprises:
   a spool which is disposed in a bore in a manner to define a feedback chamber at one end;
   a spring disposed in a control chamber defined at the other end of said spool, said control chamber being fluidly communicated with said throttle valve in a manner to receive said throttle pressure, said spool being arranged so that the effective area thereof exposed to said feedback chamber is larger than the effective area which is exposed to said throttle pressure.

3. A transmission as claimed in claim 2 wherein said throttle pressure modifier valve is supplied a pressure having a constant level and wherein the output of said throttle pressure modifier valve is controlled to a predetermined level in accordance with the force of said spring when said throttle pressure is at a zero level.

4. A transmission as claimed in claim 1 wherein said first section includes third and fourth lands, said third land having a diameter which is larger than said fourth land, said third land being acted on by said governor pressure when said spool assumes said upshift position and said fourth land being acted on by said governor pressure when said spool assumes said downshift position.

5. In a transmission
- a source of governor pressure indicative of vehicle speed;
- a throttle valve for producing a throttle pressure indicative of transmission load;
- a throttle pressure modifier valve for producing a modified throttle pressure which has a level higher than that of the throttle pressure, said throttle valve including a spring and a valve element which is biased by said spring, said throttle pressure modifier valve being supplied with a pressure having a constant level and arranged so that the output of said throttle pressure modifier valve is controlled to a predetermined level in accordance with the force of said spring when said throttle pressure is at a zero level; and
- a shift valve for selectively supplying pressurized hydraulic fluid to a friction element, said shift valve having a spool, said spool having a first section responsive to said governor pressure and which produces a bias which tends to move the spool toward an upshift position, and a second section, said second section being arranged to produce a bias which tends to move said spool toward a downshift position, said second section being exposed to said throttle pressure only when said spool assumes said upshift position and said modified throttle pressure only when said spool assumes said downshift position.

* * * * *